United States Patent [19]
Verbueken

[11] Patent Number: 5,867,528
[45] Date of Patent: Feb. 2, 1999

[54] METHOD AND MODEM FOR ADAPTIVE ALLOCATION OF THE PILOT CARRIER IN A MULTI-CARRIER SYSTEM

[75] Inventor: Herman Leo Rosalia Verbueken, Borgehout, Belgium

[73] Assignee: Alcatel Alsthom Compagnie Generale D'Electricite, Paris, France

[21] Appl. No.: 783,859

[22] Filed: Jan. 16, 1997

[30]    Foreign Application Priority Data

Jan. 16, 1996  [EP]  European Pat. Off. .............. 96200097

[51] Int. Cl.⁶ ....................................................... H04J 1/16
[52] U.S. Cl. .......................... 375/222; 375/260; 370/206; 370/491; 455/59; 455/63; 455/452; 455/513
[58] Field of Search ..................... 375/219, 222, 375/226, 227, 231, 260, 285, 295, 296, 324, 344, 349; 370/252, 491, 496, 500, 522, 437, 206, 208, 210; 455/63, 59, 69, 450, 452, 464, 509, 513, 515

[56]           References Cited

U.S. PATENT DOCUMENTS

| | | | |
|---|---|---|---|
| 4,792,984 | 12/1988 | Matsuo | 455/452 |
| 5,375,123 | 12/1994 | Andersson et al. | 455/452 |
| 5,491,837 | 2/1996 | Haartsen | 455/450 |
| 5,577,022 | 11/1996 | Padovani et al. | 370/491 |

FOREIGN PATENT DOCUMENTS

| | | |
|---|---|---|
| 0637181 | 2/1995 | European Pat. Off. . |
| 0673131 | 9/1995 | European Pat. Off. . |
| 9507581 | 3/1995 | WIPO . |

OTHER PUBLICATIONS

"Asymmetric Digital Subscriber Line (ADSL) Metallic Interface Specification", American Nat'l Stds. Institute, Inc. in Apr. 1994.

"Network and Customer Installation Interfaces, Asymmetric Digital Subscriber Line (ADSL) Metallic Interface" by American Nat'l Stds. Institute, Apr. 1994.

"Performance Evaluation of a Multichannel Transceiver System for ADSL and VHDSL Services" by Chow et al. from the IEEE Journal, vol. 9, No. 6, Aug. 1991 909–919.

"A multi–carrier E1–HDSL transceiver system with coded modulation" a by Chow et al European Transactions on Telec. and Related Tech. vol. 4, No. 3, May 1993, 257–266.

*Primary Examiner*—Amanda Le
*Attorney, Agent, or Firm*—Ware, Fressola, Van Der Sluys & Adolphson LLP

[57]           ABSTRACT

In a multi-carrier system, the pilot carrier which is transmitted between two stations for synchronisation purposes, is re-allocated to a new frequency whenever it is disturbed by noise or a single frequency disturber in the vicinity thereof. A less noisy frequency is selected by means of a specific criterion to be fulfilled, for instance based on signal to noise ratio measurements performed for all carriers in the multi-carrier system.

6 Claims, 1 Drawing Sheet

METHOD AND MODEM FOR ADAPTIVE ALLOCATION OF THE PILOT CARRIER IN A MULTI-CARRIER SYSTEM

TECHNICAL FIELD

The present invention relates to a method for allocating a pilot carrier in a multi-carrier transmission system carrying data to be transmitted between two stations, where the pilot carrier is used for synchronization between these two stations. It is also directed to a pilot carrier allocation device for selecting a pilot carrier among a set of carriers carrying data to be transmitted between two stations in a telecommunications system. It is still further directed to a multi-carrier modem wherein such a pilot carrier allocation device is used.

BACKGROUND OF THE INVENTION

Such a method and equipment wherein such a method is applied are already known in the art, e.g. from the Standard on ADSL (Asymmetric Digital Subscriber Line), entitled 'Asymmetric Digital Subscriber Line (ADSL) Metallic Interface Specification', published by the American National Standards Institute (ANSI) in Apr. 1994. More particularly, paragraphs 6.9.1.2 and 7.9.1.2 on pages 44 and 54 respectively describe the use of a pilot carrier, called pilot tone, in upstream and downstream direction to allow tuning of sample timing between transmitter and receiver. In the known method, in the upstream direction as well as in the downstream direction, the pilot tone is a fixed carrier with a frequency of 276 kHz downstream and 69 kHz upstream. The presence of noise or a single frequency disturber in the vicinity of these pilot tone frequencies leads to a reduction of the pilot tone quality and possibly to loss of synchronisation between the transmitter and receiver. As a result, the system will fail or at least degrade in performance.

SUMMARY OF THE INVENTION

An object of the present invention is to provide a method for allocating a pilot carrier used for synchronisation and equipment to perform this method of the above described type, but which guarantees synchronisation between transmitter and receiver even when noise or disturbances appear in the vicinity of the pilot carrier frequency.

According to the invention, this object is achieved by determining noise on each carrier in said set a carriers at intialisation of said system; selecting, by means of a predetermined noise criterion to be fulfilled, said pilot carrier within said set of carriers; repetitively determining noise on each said carrier during normal operation of said system; and selecting another pilot carrier within said set of carriers whenever said predetermined noise criterion is no longer fulfilled by said pilot carrier.

Another object of the invention is a pilot carrier allocation device having noise determining means adapted to determine noise on each of said carriers; selecting means adapted to select, by means of a predetermined noise criterion to be fulfilled, said pilot carrier within said set of carriers; and communication means adapted to generate pilot carrier information indicating which carrier has been selected by said selecting means to be said pilot carrier.

A still further object of the invention is a multi-carrier modem including a modulating device, coupled between a data input and a line output of said modem and adapted to modulate data on a set of carriers to be transmitted between two stations in a telecommunications system, a demodulating device, coupled between a line input and a data output of said modem and adapted to demodulate data carried by said set of carriers, and a pilot carrier allocation device adapted to select a pilot carrier within said set of carriers characterized in that said pilot carrier allocation device comprises a noise determining means adapted to determine noise on each carrier in said set of carriers; selecting means adapted to select, by means of a predetermined noise criterion to be fulfilled, said pilot carrier within said set of carriers; and communication means adapted to generate pilot carrier information indicating which carrier has been selected by said selecting means to be said pilot carrier.

Thus, whenever the quality of the pilot carrier becomes poor, the pilot carrier is re-allocated to a less noisy frequency. In this way, by selecting the pilot carrier adaptively, the pilot carrier frequency no longer is fixed.

Furthermore, different implementations of the present method can be thought off. Measurement of the signal to noise ratio on each carrier for example allows the system to re-allocate the pilot carrier to a less noisy frequency. In a similar way, measurement of the phase angle difference between received and expected carriers at the receiver's side allows the system to re-allocate the pilot carrier.

BRIEF DESCRIPTION OF THE DRAWING

The above mentioned and other objects and features of the invention will become more apparent and the invention itself will be best understood by referring to the following description of an embodiment taken in conjunction with the accompanying drawing which represents a block scheme of a multi-carrier modem MODEM provided with a pilot carrier allocation device PAD according to the present invention.

BEST MODE FOR CARRYING OUT THE INVENTION

Figure 1:
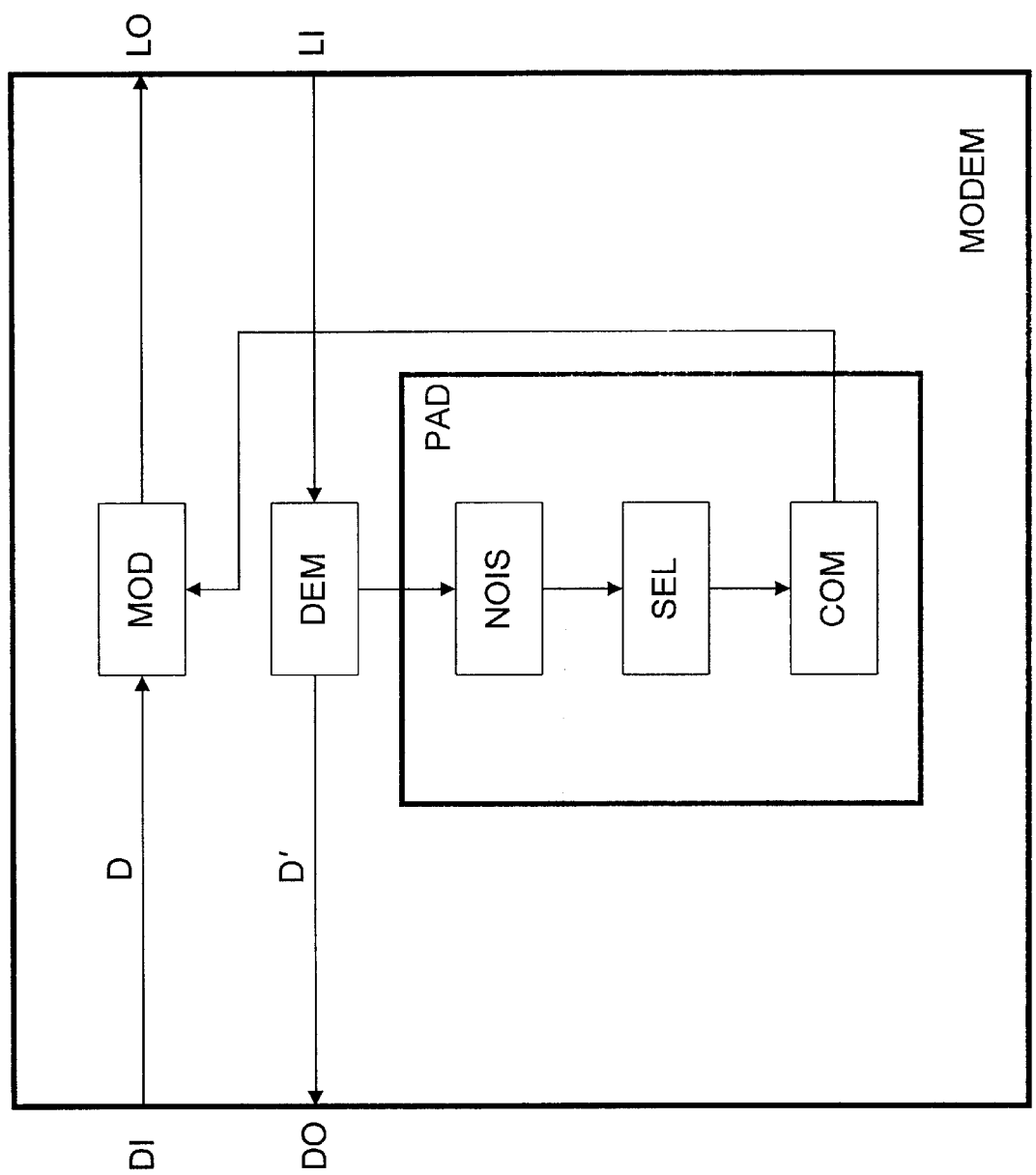

The multi-carrier modem MODEM includes a modulator MOD, a demodulator DEM, and the pilot carrier allocation device PAD. The pilot carrier allocation device PAD is equipped with a noise determining unit NOIS, a selection unit SEL and a communication unit COM.

The modulator MOD is coupled between a data input DI, via which data D are applied to the modulator MOD, and a line output LO of the modem. The demodulator DEM on the other hand, is coupled between a line input LI of the modem and a data output DO whereto demodulated data D'are applied. Another output of the demodulator DEM is coupled to an input of the pilot carrier allocation device PAD and more particularly to the noise determining unit NOIS thereof. In the pilot carrier allocation device PAD, the noise determining unit NOIS, selection unit SEL and communication unit COM are series connected. An output of the communication unit COM is connected to an additional input of the modulator MOD.

In the following paragraphs, the working of the modulator MOD, the demodulator DEM and the pilot carrier allocation device PAD will be described. However, since the modulator MOD and demodulator DEM do not differ in working from known, well-described multi-carrier modems, their working will be described rather briefly and reference will be made to documents describing such modulators and demodulators in more detail. Thus, in the following paragraphs, the attention will be attracted to the functioning of the pilot carrier allocation device PAD.

The modulator MOD and demodulator DEM are of the Discrete Multi Tone (DMT) type. Such a DMT modulator and demodulator are for instance used in the Asynchronous Digital Subscriber Line (ADSL) equipment which operates in accordance with the specifications of the ANSI Standard on ADSL, entitled 'Asymmetric Digital Subscriber Line (ADSL) Metallic Interface Specification', published by the American National Standards Institute, Inc. (ANSI) in Apr. 1994. The approved version of this ANSI Standard on ADSL is referred to by ANSI T1.413 and is entitled 'Network and Customer Installation Interfaces, Asymmetric Digital Subscriber Line (ADSL) Metallic Interface '. Therein, the line input LI and line output LO of each modem is coupled to a twisted pair telephone line. The modulator MOD modulates data bits D received via its data input DI on a set of carriers whose frequencies constitute a set of equidistant frequencies. The data bits D simultaneously transmitted on the different carriers in the set constitute Discrete Multi Tone (DMT) symbols. To perform the modulation, the modulator MOD is provided with a mapper which determines the number of data bits to be allocated to each one of the carriers, an inverse fast fourier transform processor which converts the modulated carriers from frequency domain to time domain, and a guard adder which adds to each one of the DMT symbols a cyclic prefix to compensate for intersymbol interference caused by transmission of the DMT symbols over the twisted pair telephone line. Via a digital to analog converter, the DMT symbols are made suitable for transmission over the line. The demodulator on the contrary demodulates the data from the set of carriers and applies the demodulated data D' to the data output DO of the modem. The demodulator DEM thereto is composed of an analog to digital converter, a time domain equaliser, a cyclic prefix subtractor, a fast fourier transform processing unit, a frequency domain equaliser and a demapper. The time domain equaliser is a digital filter which also compensates for intersymbol interference and which allows the cyclic prefix added to each one of the DMT symbols to have an acceptable length. The cyclic prefix subtractor removes the cyclic prefix from the received DMT symbols and the fast fourier transform processing unit converts the received symbols from time domain representation to frequency domain representation. In addition, the amplitude and phase distortion of the telephone line over which the symbols were transmitted, become compensated by a second digital filter which is implemented in the frequency domain equaliser, and the demapper performs the task of extracting the correct amount of bits of each one of the carriers. For purposes of synchronisation or sample clock adjustment between transmitting and receiving station, the demodulator DEM further includes a digital phase locked loop. The pilot carrier is applied to the input of the digital phase locked loop.

The contents of the Discrete Multi Tone modulator MOD and demodulator DEM will not be described in further detail since such a detailed description is of no importance for the present invention. Further details with respect to ADSL (Asymmetric Digital Subscriber Line) requirements are described in the already mentioned ANSI Standard on ADSL whilst specific implementations of Discrete Multi Tone modulators and demodulators are found in the articles 'A multicarrier E1-HDSL Transceiver System with Coded Modulation ', written by Peter S. Chow, Naofal Al-Dhahir, John M. Cioffi and John A. C. Bingham and published in the issue Nr. 3, May/June 1993 of the Journal of European Transactions on Telecommunications and Related Technologies (ETT), pages 257–266, and 'Performance Evaluation of a Multichannel Transceiver System for ADSL and VHDSL Services 'from Peter S. Chow et al., published in the issue Nr. 6, August 1991 of the Journal of European Transactions on Telecommunications and Related Technologies (ETT), pages 909–919.

It is to be remarked that for each new station installed, a modem such as the one drawn in the figure is included in the central office and in the new station.

At initialisation of such a new installed station noise on each one of the carriers is determined. The new installed station thereto sends a predetermined pattern to the central office. Via the demodulator DEM in the central office, the received pattern is applied to the noise determining unit NOIS which compares the received pattern to the pattern which was expected to be received. From this comparison, the noise determining unit NOIS calculates the signal to noise ratio on each carrier in the set of carriers. The results of its calculations are applied to the selection unit SEL which assigns one of the carriers to be used as pilot carrier. Carriers which are plagued by frequency disturbers or interferers and which are therefore transmitted between the new station and the central office with poor quality can not be used as pilot carrier since synchronisation may be lost as a result of the noise in the vicinity of such a carrier. Consequently, the selection unit SEL selects the carrier whose signal to noise ratio exceeds a predetermined threshold value to be the pilot carrier. In addition, the communication unit COM is informed about the selection and generates the information which, according to a communication protocol, has to be transmitted towards the new installed station to make it aware of the selection.

During normal working, the noise determining unit NOIS repetitively determines the signal to noise ratio on all carriers in a way similar as for the initialisation phase. Whenever the signal to noise ratio measured on the pilot carrier no longer exceeds the above mentioned threshold value, the pilot carrier is re-allocated to another frequency which is less noisy. In other words, if the quality of the pilot carrier degrades to a certain extent, the selection means SEL is again activated to select a new pilot carrier within the set of carriers, and the communication unit COM again generates the information which, according to the communication protocol between the remote and central station, has to be transmitted to inform the station about the change in pilot carrier.

It should be noted that the earlier cited digital phase locked loop in the demodulator DEM has to be informed about any re-allocation of the pilot carrier since it has to adapt its coefficients accordingly. Also a possible re-allocation of user data-bits might be required.

In addition, it should also be noted that although the present invention is illustrated in the above paragraphs for the upstream direction, it is clear to any person skilled in the art that the method also applies to downstream transmission, i.e. in the direction from the central office to a remote station.

Furthermore it is noted that the re-allocation of the pilot carrier does not necessarily have to be based on signal to noise ratio measurements as described in the above specific embodiment. It is clear to a person skilled in the art that any measurement giving an indication of the noise on each of the carriers can be used to re-allocate the pilot carrier. In an alternative embodiment, for instance, the average phase angle difference measured between the vectors representing the received carriers and the carriers expected to be received, may be used to gain information about the noise on the different carriers. Obviously, this phase angle difference has to be sufficiently small. The selection unit SEL of such an alternative embodiment selects a pilot carrier with a phase angle difference below a predetermined threshold. The selection or re-allocation of the pilot carrier can also be based on the before hand knowledge that certain carriers are likely to be disturbed e.g. because of existing radio transmitters in the given frequency band.

Moreover, it is noted that the idea of re-allocating the pilot carrier whenever it is disturbed by noise in the vicinity of the pilot carrier frequency can be implemented in any multi-carrier telecommunication system wherein one or more frequencies are reserved for synchronisation purposes. The implementation of the present method is clearly not restricted to Discrete Multi Tone modems or to the field of ADSL.

While the principles of the invention have been described above in connection with specific apparatus, it is to be clearly understood that this description is made only by way of example and not as a limitation on the scope of the invention.

I claim:

1. A method for selecting a pilot carrier among a set of carriers carrying data to be transmitted between two stations in a telecommunication system, said pilot carrier being used for synchronisation between said two stations, characterized in that said method comprises the steps of:

a) determining noise on each carrier in said set of carriers at initialisation of said system;

b) selecting, by means of a predetermined noise criterion to be fulfilled, said pilot carrier within said set of carriers;

c) repetitively determining noise on each said carrier during normal operation of said system; and d) selecting another pilot carrier within said set of carriers whenever said predetermined noise criterion is no longer fulfilled by said pilot carrier.

2. A method according to claim 1, characterized in that to determine said noise on said carriers, the signal to noise ratio value of each carrier in said set of carriers is measured, and in that the signal to noise ratio of said pilot tone carrier has to exceed a predetermined threshold value to fulfill said predetermined criterion.

3. A method according to claim 1, characterized in that to determine said noise on each said carrier received by one of said two stations, a phase angle difference between said carrier received and a carrier expected to be received is determined, and in that said phase angle difference with respect to said pilot carrier has to be below a predetermined maximum phase angle difference to fulfill said predetermined criterion.

4. A method according to claim 1, characterized in that said telecommunications system is an Asymmetric Digital Subscriber Line (ADSL) system, wherein said data is modulated on said set of carriers and constitutes Discrete Multi Tone (DMT) symbols.

5. A pilot carrier allocation device (PAD) for selecting a pilot carrier among a set of carriers carrying data to be transmitted between two stations in a telecommunications system, characterized in that said pilot carrier allocation device (PAD) comprises:

a) noise determining means (NOIS) adapted to determine noise on each of said carriers;

b) selecting means (SEL) adapted to select, by means of a predetermined noise criterion to be fulfilled, said pilot carrier within said set of carriers; and c) communication means (COM) adapted to generate pilot carrier information indicating which carrier has been selected by said selecting means (SEL) to be said pilot carrier.

6. A multi-carrier modem (MODEM) including a modulating device (MOD), coupled between a data input (DI) and a line output (LO) of said modem (MODEM) and adapted to modulate data (D) on a set of carriers to be transmitted between two stations in a telecommunications system, a demodulating device (DEM), coupled between a line input (LI) and a data output (DO) of said modem (MODEM) and adapted to demodulate data carried by said set of carriers, and a pilot carrier allocation device (PAD) adapted to select a pilot carrier within said set of carriers characterized in that said pilot carrier allocation device (PAD) comprises:

a) noise determining means (NOIS) adapted to determine noise on each carrier in said set of carriers;

b) selecting means (SEL) adapted to select, by means of a predetermined noise criterion to be fulfilled, said pilot carrier within said set of carriers; and c) communication means (COM) adapted to generate pilot carrier information indicating which carrier has been selected by said selecting means (SEL) to be said pilot carrier.

* * * * *